Patented June 26, 1923.

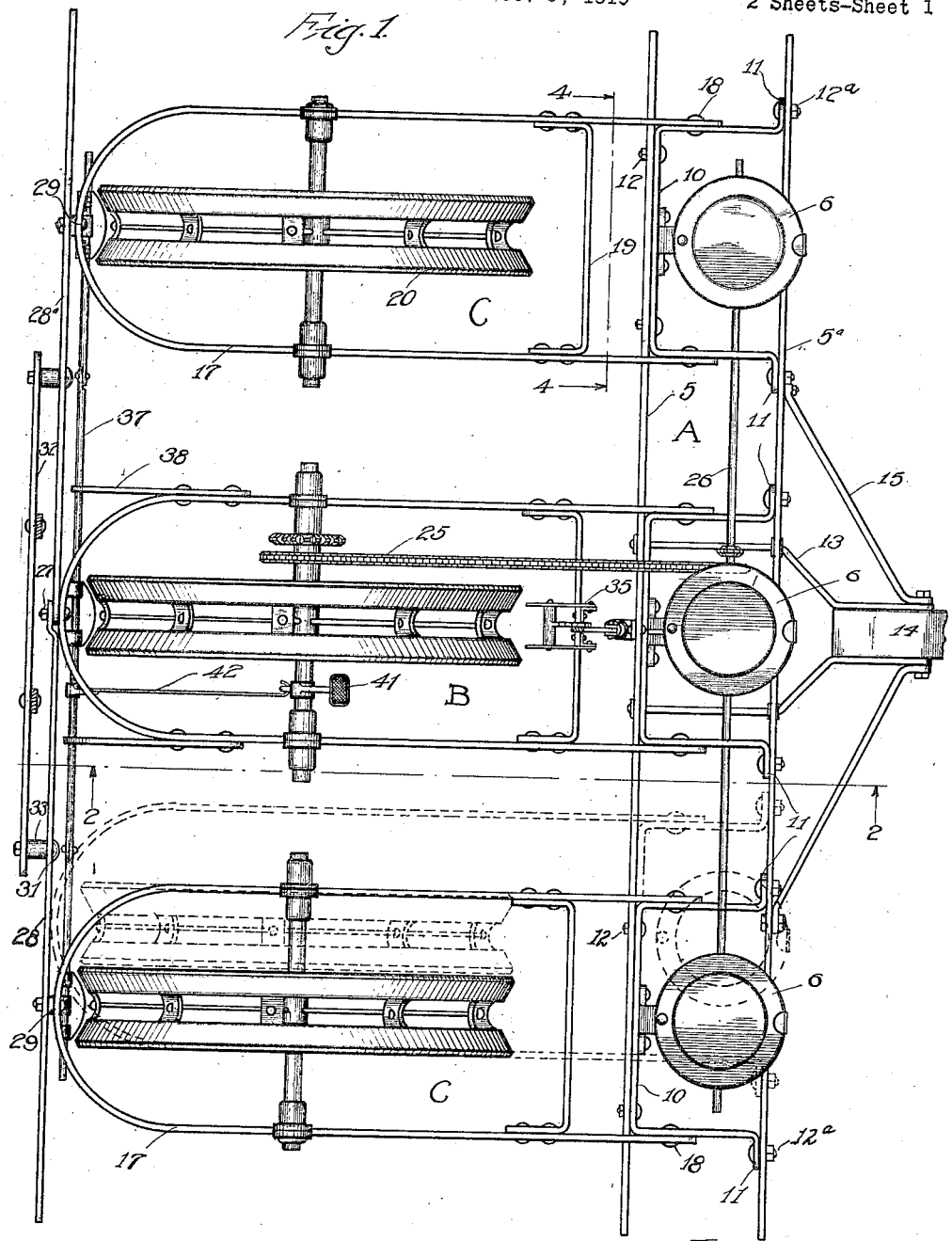

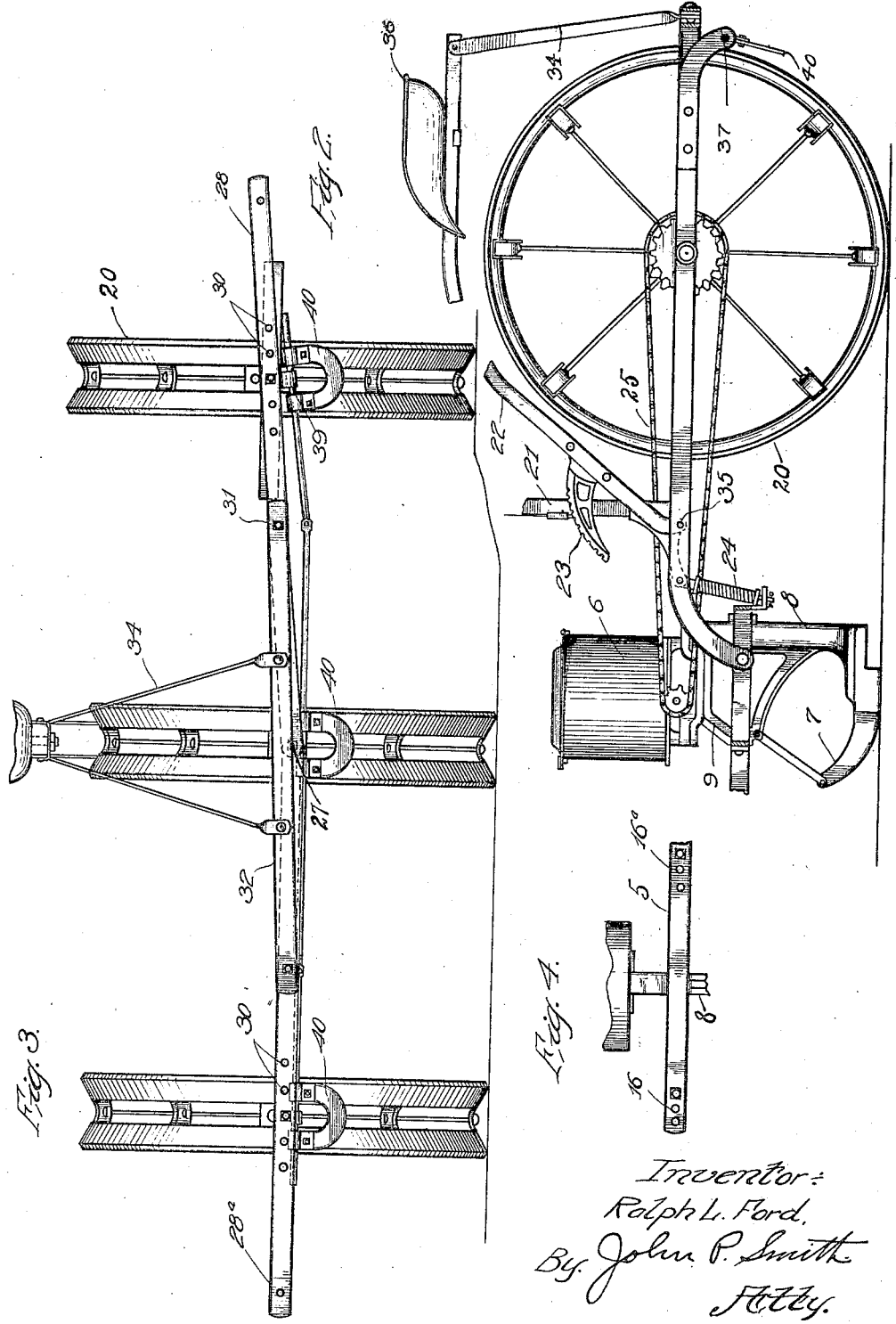

1,460,236

UNITED STATES PATENT OFFICE.

RALPH L. FORD, OF CHICAGO, ILLINOIS, ASSIGNOR TO INTERNATIONAL HARVESTER COMPANY, A CORPORATION OF NEW JERSEY.

THREE-ROW PLANTER.

Application filed December 8, 1919. Serial No. 343,393.

*To all whom it may concern:*

Be it known that I, RALPH L. FORD, a citizen of the United States, residing at Chicago, in the county of Cook and State of Illinois, have invented certain new and useful Improvements in Three-Row Planters, of which the following is a full, clear, and exact specification.

My invention relates to planting machines, and more particularly to the type employed to plant corn, or like grain, in spaced rows.

One object of my invention is to produce a machine that is of simple and economical construction, and so organized that several rows may be planted at once at variable distance from each other.

Another object is to provide such a machine with combined supporting and covering wheels, so mounted that they will trail the planting units and accommodate themselves to inequalities in the ground during travel.

Another object is to so relate the seat support to the several covering wheels as to obtain equal distribution of weight on all the covering wheels, while permitting each to have independent vertical movement.

With these main and other incidental objects in view, my invention consists of the organization, details of construction, parts, or their equivalents, hereinafter described and more particularly defined in the claims.

Referring to the drawings:

Fig. 1 is a plan view of a machine embodying the principles of my invention, the dotted lines showing lateral adjustment of one frame;

Fig. 2 is a vertical section on the line 2—2 of Fig. 1;

Fig. 3 is a rear elevation showing one of the wheels elevated as when passing over a rise in the ground; and Fig. 4 is a detail section taken on the line 4—4 of Fig. 1, with the hopper and boot broken away.

In general, the machine consists of a supporting or runner frame A, a central trailing frame B and lateral frames C. The runner frame is composed of transverse members or sills 5, 5ª. This carries a plurality of planting units, each of which is composed of a hopper 6, runner 7 and boot 8.

These are connected by a bracket 9, and to the rear of each boot there is connected a horizontal bracket 10 which is formed of a strip of metal having a transverse portion and arms at right angles thereto, which in turn have laterally bent portions forming feet 11. These brackets are connected to the transverse members 5, 5ª of the runner frame by bolts 12, 12ª which pass through the transverse portion of the bracket and the feet 11 respectively. The hoppers, boots and runners and the seed dispensing mechanism employed in connection with each unit may be of ordinary construction, and form no part of my present invention. The planting units are identical in construction, but the central unit is fixed to the runner frame and has tongue supporting members 13 passing through the transverse portion of its supporting bracket 10, as well as through the transverse members of the runner frame. These members 13 are bent inwardly at their forward ends and support the usual tongue 14 which is further braced by means of the lateral member 15. The planting units at each end of the runner frame are made laterally adjustable thereon by provision of a series of openings as at 16 and 16ª in Fig. 4.

In connection with each planting unit there is a trailer frame which is composed of a metal strip 17 bowed at its center and having the forward ends of its arms downwardly directed and pivotally connected at 18 to the arms of the bracket 10. The sides of each trailer frame are braced by a transverse member 19. In each frame there is journaled the axle of a combined supporting and covering wheel 20. The central frame has mounted thereon a runner adjusting lever 21 which is journaled on the frame between the arms of a seat support 22 which carries the usual rack 23. The adjusting lever is connected to the runner frame by a spring link 24, and operates in the usual manner to vary the depth of planting by adjustment of the runner frame. The central frame also carries the drive for the seeding mechanism which may be of the chain and sprocket type, as shown at 25 the chain driving seeder shaft 26 which is preferably made in one piece and common to all the planter units. To the rearmost portion of the central frame there is loosely connected as at 27 a pair of laterally extending links 28, 28ª, each of which is in turn loosely connected at 29 to the rear of a side frame. A series of openings, as at 30, Fig. 3, is provided in each link to permit lateral adjustment of the side frames in the same manner as on the runner frame. Intermediate the ends of each of the links 28, 28ᵃ there is pivotally connected, as at 31, an evener bar 32 which may be slightly spaced from the links by collars 33 mounted on the pivot bolts. At equal distances from the ends of the evener bar there is loosely connected upwardly extending members 34 which are loosely connected at their upper ends to the rear end of the seat support 22 which has its front end pivotally connected to the central frame at 35. This support carries the usual driver's seat 36. A jointed scraper shaft 37 is supported by brackets 38 on the central frame and by hangers 39 on the side frames. This shaft carries a scraper 40 for each wheel, and the shaft is rocked to bring the scrapers in operative position when desired by means of a pedal 41 mounted on the wheel axle of the central frame and connected by a link 42 with a crank arm on the scraper shaft. The links 28, 28ᵃ and evener bars 32 together compose an articulated connection between the frames, and the joints in the scraper shaft are so spaced as to enable it to follow the movements of these connections.

It will be plain from the above description taken in connection with the drawings, that each trailer frame is capable of a considerable range of independent vertical movement, and that the side frames may be laterally adjusted as shown in Fig. 1, by setting the connecting bolts in any one of the openings in the runner frame and rear links. It will also be plain that the driver's weight is carried mainly by the evener bar 32 and that it is distributed by said bar equally to all the frames and wheels through the links 28, 28ᵃ in whatever position of adjustment the lateral frames may be.

It will be understood that the construction here disclosed is merely illustrative and that changes within the scope of the appended claims may be made.

What I claim is:

1. The combination of a rigid frame, a series of spaced planting units provided with runners supporting said frame, a trailer frame loosely connected to each unit, a wheel in each trailer frame in alignment with the planting unit, articulated connections joining the trailer frames, and a seat support resting on said connections.

2. The combination of a rigid frame, a series of spaced planting units provided with runners supporting said frame, a trailer frame loosely connected to each unit, a wheel in each trailer frame in alignment with the planting unit, articulated connections joining the rear ends of the trailer frames, and a seat support resting on said connections.

3. The combination of a rigid frame, a series of spaced planting units provided with runners supporting said frame, a frame connected to each unit for vertical movement, a wheel in each frame in alignment with each planting unit, a link extending from each movable frame to the next and loosely connected at each end to the frames, and an evener link loosely connected to two of said links.

4. The combination of a rigid frame, a series of spaced planting units provided with runners supporting said frame, a frame connected to each unit for vertical movement, a wheel in each frame in alignment with each planting unit, a link extending from each movable frame to the next and loosely connected at each end to the frames, an evener link loosely connected to two of said links, and a seat support connected to one of the movable frames at its forward end and having its rear end resting on the evener link.

5. In a planter, a forward support comprising parallel transversely extending bars, a supporting bracket including laterally spaced arms mounted between said parallel members, a planting unit mounted between the arms of the bracket, a U-shaped trailer frame having its branches pivoted to the arms of the bracket for movement vertically, a supporting wheel journaled within the trailer frame in alinement with the planting unit and driving means between the wheel and planting unit.

6. In a planter, a forward support comprising parallel transversely extending bars, a plurality of supporting brackets each including laterally spaced arms mounted between said parallel members so as to be adjustable towards and from one another, planting units mounted between the arms of the brackets and adjustable therewith, independent U-shaped trailer frames having their branches pivoted to the bracket arms for vertical movement, a supporting wheel within each trailer frame, and actuating means for the planting units driven from one of the supporting wheels.

7. In a planter, a forward support, three transversely arranged trailer frames connected to said support for vertical movement, links loosely connecting the central frame to the lateral frames and an evener link loosely connected to both of said links.

8. In a planter, a forward support, three transversely arranged trailer frames connected to said support for vertical movement, links loosely connecting the central frame to the lateral frames, an evener link loosely connected to both of said links, and a seat support having its forward end pivotally connected to the central frame and its rear end supported on the evener link.

In testimony whereof I affix my signature.

RALPH L. FORD.